(12) United States Patent
Fung et al.

(10) Patent No.: US 8,444,871 B2
(45) Date of Patent: May 21, 2013

(54) SLURRY COMPOSITION CONTAINING CRACKING AGENT

(75) Inventors: Dein-Run Fung, Taipei (TW); Te-Chao Liao, Taipei (TW); Hao-Sheng Chen, Taipei (TW)

(73) Assignee: Nan Ya Plastics Corporation (TW)

( * ) Notice: Subject to any disclaimer, the term of this patent is extended or adjusted under 35 U.S.C. 154(b) by 109 days.

(21) Appl. No.: 13/004,068

(22) Filed: Jan. 11, 2011

(65) Prior Publication Data

US 2011/0220834 A1    Sep. 15, 2011

(30) Foreign Application Priority Data

Mar. 9, 2010   (TW) ................................ 99106707 A

(51) Int. Cl.
*D06M 15/00* (2006.01)
(52) U.S. Cl.
USPC ........................................................ 252/8.83

(58) Field of Classification Search
None
See application file for complete search history.

(56) References Cited

U.S. PATENT DOCUMENTS 3,705,052 A * 12/1972 Marzocchi .................... 523/217
4,780,339 A * 10/1988 Lacourse et al. ........... 427/389.7
2011/0053754 A1 * 3/2011 Shock et al. .................... 501/35

* cited by examiner

*Primary Examiner* — Melvin C Mayes
*Assistant Examiner* — Colette Nguyen
(74) *Attorney, Agent, or Firm* — Bacon & Thomas, PLLC

(57) ABSTRACT

A slurry composition containing a cracking agent contains paste 1.5-4.0 wt %, oil 1.0-3.0 wt %, a surfactant 0.2-0.5 wt %, a softening agent 0.1-0.5 wt % and a cracking agent 0.005-5.0 wt %. As compared with the formula of known raw slurry for fiberglass yarn, this slurry composition containing the cracking agent facilitates improving desizing efficiency of fiberglass fabric, lowering the required temperature for the second desizing process, shortening desizing time, reducing the loss on ignition, and enhancing the strength of the fiberglass fabric.

4 Claims, No Drawings

SLURRY COMPOSITION CONTAINING CRACKING AGENT

BACKGROUND OF THE PRESENT INVENTION

1. Field of the Present Invention

The present invention relates to slurry compositions, and more particularly, to a slurry composition that contains a cracking agent and helps to improve efficiency of fiberglass desizing.

2. Description of Prior Art

A conventional process for making fiberglass roving mainly includes three procedures, namely glass melting, melt spinning and twisting. In melt spinning, steps of spinning, sizing and winding are performed. Therein, melted gobs pass through the spinneret in a platinum bushing and then flow downward by gravity to be instantly cooled in water mist, before getting impregnated with conventional slurry for fiberglass yarn at its surface by a sizing device (hereinafter referred to as "sizing"). Afterward, a collector collects hundreds of fiberglass strings into strands, which are wound into fiberglass cakes by a high-speed winder.

The foregoing slurry for fiberglass yarn, acting as both a lubricant and a binder, is primarily composed of: paste, oil, a coupling agent, a surfactant, an antistatic agent, an antioxidant, pigment and water.

Sized fiberglass strands with their surfaces impregnated with slurry are protected from mutually wearing and attritting. Thereby, in the course of making fiberglass roving or in the course of weaving with the wrap and woof made of fiberglass strands, the slurry covers the fiberglass strands helps to reduce friction and broken yarn, thus improving weaving efficiency as well as fabric quality.

At the completion of fabric, the slurry covering the fiberglass has finished its job and needs to be removed (hereinafter referred to as "desizing") before the sequent cloth treatment so as to ensure the high physical strength of the fiberglass deserves in nature.

In fiberglass cloth manufacturing, the adopted high-temperature desizing is completed by two desizing processes. The first desizing process is a continuous treatment for burning out the 80-90% of the slurry form the cloth at 360-380° C. with a speed of 40-90 m/min. After the first desizing process, the fiberglass cloth is input to the second desizing furnace in batch for removing the rest of the slurry, so as to lower the loss on ignition (LOI) of the cloth to 0.05% or below, practically negligible. However, since the second desizing process has to be performed at a temperature as high as 360-380° C. for 36-65 hours, it can considerably consume energy and adversely affect the strength of the resultant fiberglass fabric.

While some inventions related to slurry for fiberglass yarn have been disclosed in earlier patent literature, there is no mention about addition of a cracking agent in the slurry.

For example, U.S. Pat. No. 4,932,108 proposes a process for bulking of glass fiber, wherein a thermoplastic material composed of starch, wax, a plasticizer, an emulsifiers, a cationic lubricant and a wetting agents is applied to glass fiber.

U.S. Pat. No. 4,530,876 has disclosed a sizing composition of fiberglass, which is composed of polyvinyl alcohol, second film forming polymer, spermaceti wax, straight chain fatty acids with 12 to 32 carbon atoms and hydroxylated derivative thereof and mixtures thereof.

SUMMARY OF THE INVENTION

In view of this, and for improving and surmounting the characteristics of the known slurry for fiberglass yarn, the present invention herein discloses a slurry composition containing a cracking agent, for use of fiberglass sizing, so as to enhance the desizing efficiency of the fiberglass fabric woven from the fiberglass roving. Its effects include lowering the required temperature for the second desizing process of the fiberglass fabric, shortening desizing time, reducing the loss on ignition (LOI) to 0.05% or below so as to save energy, and enhancing the strength of the fiberglass fabric by 10~50%.

The slurry composition of the present invention has solid taking up 4.0-8.0 wt % of the aqueous slurry solution, and contains following ingredients:

1. paste, taking up 1.5-4.0 wt % of the slurry solution;
2. oil, taking up 1.0-3.0 wt % of the slurry solution;
3. a surfactant, taking up 0.2-0.5 wt % of the slurry solution;
4. a softening agent, taking up 0.1-0.5 wt % of the slurry solution; and
5. a cracking agent, taking up 0.005-5.0 wt % of the slurry solution, wherein, the cracking agent contains 0.005-5 wt % of a metallic oxide, 0-5 wt % of a peroxide and 0-5 wt % of a sensitizer.

As compared with the known formulas of slurry for fiberglass yarn, the present invention adds the cracking agent to the slurry composition and brings about the advantages of improving desizing efficiency of the fiberglass fabric, lowering the required temperature for the second desizing process, shortening desizing time, reducing the loss on ignition and enhancing the strength of the fiberglass fabric. In particularly, in virtue of the catalysis provided by the cracking agent, the second desizing process now requires only 300~380° C. for 12-60 hrs in contrast with the known approach that needs burning at 360-380° C. for 36-65 hours, while the loss on ignition is limited to 0.05% or below.

DETAILED DESCRIPTION OF THE INVENTION

The present invention discloses a slurry composition containing a cracking agent, and having 4.0-8.0 wt % of solid in the slurry solution. The disclosed slurry composition contains the following ingredients:

1. paste, accounting for 1.5-4.0 wt % of the slurry solution and being one selected from or a mixture of any two or more selected from the group consisting of starch, vinyl emulsion and polycondensation emulsion, wherein said starch may be from corn, wheat or potato and said vinyl emulsion may be polyvinyl acetate, acrylic resin or polyvinyl proprionate while said polycondensation emulsion may be epoxy polymer or polyester polymer, in which said paste is preferably corn starch and/or potato starch;
2. oil, accounting for 1.0-3.0 wt % of the slurry solution and being one selected from or a mixture of any two or more selected from the group consisting of hydrogenated corn oil, soybean oil, adipocere and plant oil, wherein said oil is preferably hydrogenated soybean oil and/or adipocere;
3. a surfactant, accounting for 0.2-0.5 wt % of the slurry solution and being one selected from or a mixture of the group consisting of polyethyleneglycol sorbitan and polyethylene oxide, wherein polyethyleneglycol sorbitan is more preferable;
4. a softening agent, accounting for 0.1-0.5 wt % of the slurry solution and being one selected from or a mixture of the group consisting of amine, vinylamine oxide, quaternary ammonium salt and a cation derivative, wherein said amine is preferably primary amine and said cation derivative is preferably amide; and
5. a cracking agent, accounting for 0.005-5.0 wt % of the slurry solution, serving to facilitate cracking in starch, and containing:

a) metallic oxide 0.005-5 wt %;
b) peroxide 0-5 wt %; and
c) a sensitizer 0-5 wt %.

The slurry composition of the present invention features the cracking agent that provides some certain benefits.

First, since metallic oxide is highly active, when added in to the slurry in nano size, it serves to effectively lower the onset cracking temperatures of the surfactant and the softening agent in the slurry, so as to achieve desired low-temperature cracking.

The adopted metallic oxide may be one selected from or a mixture of any two or more selected from the group consisting of aluminum oxide, silicon dioxide, germanium oxide, nickel oxide, zinc oxide, copper oxide, cobalt oxide, iron oxide, manganese oxide, chromium oxide, titanium oxide, magnesium oxide, calcium oxide, tungsten oxide, zirconium oxide, tin oxide and gallium oxide, or may be a sinter formed by firing or co-firing, under a high temperature, any one or more selected from the aforementioned group, whose primary particle diameter is preferably 3-200 nm, so as to provide relatively large overall reacting area and to thereby achieve low-temperature cracking.

Second, the peroxide in the slurry serves to not only, together with the nano-sized metallic oxide, achieve low-temperature cracking, but also generate free radicals that prompt the slurry to crack, so as to minimize the final residual slurry on the fiberglass fabric after the high-temperature desizing process. Said peroxide may be one selected from or a mixture of any two or more selected from the group consisting of 2,5-dimethyl-2,5-di(tert-butylperoxy)hexane, di-tert-butyl peroxide, dicumyl peroxide, dibenzoyl peroxide, t-butylcumyl peroxide and tert-butyl peroxybenzoate.

Therein, 2,5-dimethyl-2,5-di(tert-butylperoxy)hexane has a molecular formula of $C_{16}H_{34}O_4$, and is commercially known as Trigonox 101.

Di-tert-butyl peroxide has a molecular formula of $C_8H_{18}O_2$, and is commercially known as Trigonox B.

Dicumyl peroxide has a molecular formula of $C_{18}H_{22}O_2$, and is called as DCP for short.

Dibenzoyl peroxide has a molecular formula of $C_{14}H_{10}O_4$, and is called as BPO for short.

T-butylcumyl peroxide has a molecular formula of $C_{13}H_{20}O_2$, and is called as TBCP for short.

Tert-butyl peroxybenzoate has a molecular formula of $C_{11}H_{14}O_3$, and is called as TBPB for short.

Third, the slurry contains the sensitizer and the nano-sized metallic oxide, or further contains the peroxide so as to achieve low-temperature cracking. In addition, the sensitizer featuring its resonance structure serves to transmit energy to the slurry in a resonance form, thereby helping the slurry to crack and minimize the final residual slurry on the fiberglass fabric after the high-temperature desizing process. The sensitizer may be one selected from or a mixture of any two or more selected from the group consisting of 4,4'-Azobis(4-cyanopentanoic Acid), 2,2-Azobis(2,4,4-trimethylpentane), N-phenyl glycine, tetraethyl Michler's ketone and 1,7-bis(9-acridinyl)heptane.

Therein, 4,4'-Azobis(4-cyanopentanoic acid) has a molecular formula of $C_{12}H_{16}N_4O_4$, and is commercially known as V-501;

2,2-Azobis(2,4,4-trimethylpentane) has a molecular formula of $C_{16}H_{34}N_2$, and is commercially known as VR-110, or Azo-tert-octane.

N-phenyl glycine has a molecular formula of $C_8H_9NO_2$, and is called NPG for short.

Tetraethyl Michler's ketone has a molecular formula of $C_{21}H_{28}N_2O$, also known as 4,4'-bis(diethylamino)benzophenone.

1,7-bis(9-acridinyl)heptane has a molecular formula of $C_{33}H_{30}N_2$, and is commercially known as CHEMCURE-96.

Hereinafter, some embodiments and comparative examples will be described for characterizing the slurry composition of the present invention, yet, they are not intended to limit the present invention to any extent.

In experiments, the slurry formulas of the recited embodiments and comparative examples were used to impregnate fiberglass cloth, and the specific tests were conducted to measure the loss on ignition (LOI %) for desizing of the fiberglass cloth. At last, ASTM D638 test was performed to assess the fiberglass cloth's MD/CD ratio of tensile strength.

1. The slurry composition formulas were prepared for Embodiments 1-7 and Comparative Examples 1-4 as shown in Table 1.
2. Fiberglass cloth was impregnated with the prepared slurry while rollers were used for facilitating absorption.
3. After absorption, the fiberglass was baked at 160° C. for 1 minute.
4. The fiberglass was folded into square samples.
5. The samples were put into a high-temperature furnace for calcination at 380° C. for 55 hours, at 380° C. for 42 hours and at 350° C. for 55 hours, respectively.
6. The calcined samples were weighted (W1).
7. The high-temperature furnace was heated to 625° C. for subsequent 30-minute calcination and then the calcined samples were again weighted (W2). At this time the impregnated slurry was burned out and only the fiberglass cloth was left.
8. The loss on ignition was calculated, wherein LOI %=(W1−W2)/W1×100%. The lower loss on ignition (LOI %) for desizing means that the slurry formula was more effective in improving the desizing efficiency of the fiberglass.
9. ASTM D638 tests were conducted to use Zwick 1474 at 23° C. and 20 mm/min for assessing MD/CD ratio of tensile strength of the fiberglass after the desizing process of Step 7.

Embodiment 1

According to Table 1, 100 grams of known raw slurry was added with 1 gram of 10 nm aluminum oxide and well mixed into uniform slurry. The loss on ignition (LOI %) for desizing and the MD/CD ratio of tensile strength of the fiberglass cloth were assessed in the manner given above.

The test results are reflected in Table 1. For calcination at 380° C. for 55 hours, the loss on ignition was 0.038% and the MD/CD tensile strength was 21.6/13.6 kg/cm$^2$. For calcination at 380° C. for 42 hours, the loss on ignition was 0.047% and the MD/CD tensile strength was 22.2/13.8 kg/cm$^2$. For calcination at 350° C. for 55 hours, the loss on ignition was 0.049% and the MD/CD tensile strength was 28.4/18.4 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Embodiment 2

According to Table 1, 100 grams of known raw slurry was added with 1 gram of 10 nm aluminum oxide and 3 grams of peroxide and well mixed into uniform slurry.

The test results are reflected in Table 1. For calcination at 380° C. for 55 hours, the loss on ignition was 0.035% and the MD/CD tensile strength was 21.8/13.7 kg/cm$^2$. For calcination at 380° C. for 42 hours, the loss on ignition was 0.045% and the MD/CD tensile strength was 22.3/13.9 kg/cm$^2$. For calcination at 350° C. for 55 hours, the loss on ignition was 0.048% and the MD/CD tensile strength was 29.3/18.6 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Embodiment 3

According to Table 1, 100 grams of known raw slurry was added with 1 gram of 10 nm aluminum oxide and 1 gram of the sensitizer NPG and well mixed into uniform slurry.

The test results are reflected in Table 1. For calcination at 380° C. for 55 hours, the loss on ignition was 0.038% and the MD/CD tensile strength was 21.7/13.6 kg/cm$^2$. For calcination at 380° C. for 42 hours, the loss on ignition was 0.047% and the MD/CD tensile strength was 22.4/14.2 kg/cm$^2$. For calcination at 350° C. for 55 hours, the loss on ignition was 0.049% and the MD/CD tensile strength was 28.4/18.7 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Embodiment 4

According to Table 1, 100 grams of known raw slurry was added with 1 gram of 10 nm aluminum oxide, 1 gram of the sensitizer NPG and 3 grams of the peroxide DCP and well mixed into uniform slurry.

The test results are reflected in Table 1. For calcination at 380° C. for 55 hours, the loss on ignition was 0.031% and the MD/CD tensile strength was 21.9/13.8 kg/cm$^2$. For calcination at 380° C. for 42 hours, the loss on ignition was 0.038% and the MD/CD tensile strength was 22.5/13.9 kg/cm$^2$. For calcination at 350° C. for 55 hours, the loss on ignition was 0.045% and the MD/CD tensile strength was 30.8/19.3 kg/cm$^2$.

In the present embodiment, the slurry remained the loss on ignition lower than 0.045%, even lower than those shown in Embodiments 1 through 3. Moreover, in the present embodiment, calcination at 350° C. for 55 hours led to the MD/CD tensile strength of 30.8/19.3 kg/cm$^2$, more preferable than those shown in Embodiments 1 through 3.

Embodiment 5

According to Table 1, 100 grams of known raw slurry was added with 1 gram of 10 nm zirconium oxide, 1 gram of the sensitizer CHEMCURE96 and 3 grams of the peroxide TBCP and well mixed into uniform slurry.

The test results are reflected in Table 1. For calcination at 380° C. for 55 hours, the loss on ignition was 0.033% and the MD/CD tensile strength was 21.6/13.4 kg/cm$^2$. For calcination at 380° C. for 42 hours, the loss on ignition was 0.045% and the MD/CD tensile strength was 22.6/13.8 kg/cm$^2$. For calcination at 350° C. for 55 hours, the loss on ignition was 0.047% and the MD/CD tensile strength was 29.5/18.2 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Embodiment 6

According to Table 1, 100 grams of known raw slurry was added with 1 gram of a mixture of aluminum oxide and silicon oxide, 1 gram of the sensitizer EAB and 3 grams of the peroxide TBP and well mixed into uniform slurry.

The test results are reflected in Table 1. For calcination at 380° C. for 55 hours, the loss on ignition was 0.035% and the MD/CD tensile strength was 21.7/13.2 kg/cm$^2$. For calcination at 380° C. for 42 hours, the loss on ignition was 0.046% and the MD/CD tensile strength was 22.4/13.7 kg/cm$^2$. For calcination at 350° C. for 55 hours, the loss on ignition was 0.048% and the MD/CD tensile strength was 29.3/18.9 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Embodiment 7

According to Table 1, 100 grams of known raw slurry was added with 0.5 grams of 10 nm aluminum oxide, 0.5 grams of 10 nm zirconium oxide, 1 gram of the sensitizer EAB and 3 grams of the peroxide BPO and well mixed into uniform slurry.

The test results are reflected in Table 1. For calcination at 380° C. for 55 hours, the loss on ignition was 0.034% and the MD/CD tensile strength was 21.5/13.6 kg/cm$^2$. For calcination at 380° C. for 42 hours, the loss on ignition was 0.043% and the MD/CD tensile strength was 22.3/13.9 kg/cm$^2$. For calcination at 350° C. for 55 hours, the loss on ignition was 0.046% and the MD/CD tensile strength was 28.4/18.3 kg/cm$^2$.

In all the cases, the slurry remained the loss on ignition lower than 0.05%, and presented the highest tensile strength as a result of calcination at 350° C. for 55 hours, suggesting that low temperature is beneficial to good tensile strength.

Comparative Example 1

According to Table 1, 100 grams of known raw slurry was mixed into uniform slurry.

The test results are reflected in Table 1. For calcination at 380° C. for 55 hours, the loss on ignition was 0.050% and the MD/CD tensile strength was 21.6/13.3 kg/cm$^2$. For calcination at 380° C. for 42 hours, the loss on ignition was 0.072% and the MD/CD tensile strength was 22.1/13.8 kg/cm$^2$. For calcination at 350° C. for 55 hours, the loss on ignition was 0.081% and the MD/CD tensile strength was 28.4/18.3 kg/cm$^2$.

The LOI of 0.05% was only achieved by calcination at 380° C. for 55 hours. Neither lowering temperature nor shortening time successfully made it become lower than 0.050%. The highest tensile strength appeared as a result of calcination at 350° C. for 55 hours.

Comparative Example 2

According to Table 1, 100 grams of known raw slurry was added with 1.0 gram of aluminum oxide with a particle diameter of 3-5 μm and well mixed into uniform slurry.

The test results are reflected in Table 1. For calcination at 380° C. for 55 hours, the loss on ignition was 0.052% and the MD/CD tensile strength was 21.5/13.0 kg/cm². For calcination at 380° C. for 42 hours, the loss on ignition was 0.078% and the MD/CD tensile strength was 21.9/13.7 kg/cm². For calcination at 350° C. for 55 hours, the loss on ignition was 0.085% and the MD/CD tensile strength was 28.2/18.1 kg/cm².

The LOI was 0.052% after calcination at 380° C. for 55 hours. Neither lowering temperature nor shortening time successfully made it become lower than 0.050%.

Comparative Example 3

According to Table 1, 100 grams of known raw slurry was added with 1 gram of the sensitizer NPG and well mixed into uniform slurry.

The test results are reflected in Table 1. For calcination at 380° C. for 55 hours, the loss on ignition was 0.049% and the MD/CD tensile strength was 21.3/13.2 kg/cm². For calcination at 380° C. for 42 hours, the loss on ignition was 0.070% and the MD/CD tensile strength was 22.0/13.8 kg/cm². For calcination at 350° C. for 55 hours, the loss on ignition was 0.076% and the MD/CD tensile strength was 28.6/18.9 kg/cm².

The LOI of 0.05% was only achieved by calcination at 380° C. for 55 hours. The results resembled to those of Comparative Example 1 where no assistant was added. This indicates that effect of sole use of the sensitizer NPG is limited. The highest tensile strength also appeared as a result of calcination at 350° C. for 55 hours.

Comparative Example 4

According to Table 1, 100 grams of known raw slurry was added with 3 grams of the peroxide DCP and well mixed into uniform slurry.

The test results are reflected in Table 1. For calcination at 380° C. for 55 hours, the loss on ignition was 0.049% and the MD/CD tensile strength was 21.4/13.3 kg/cm². For calcination at 380° C. for 42 hours, the loss on ignition was 0.061% and the MD/CD tensile strength was 22.2/13.9 kg/cm². For calcination at 350° C. for 55 hours, the loss on ignition was 0.072% and the MD/CD tensile strength was 28.9/18.7 kg/cm².

The LOI of 0.05% was only achieved by calcination at 380° C. for 55 hours. The highest tensile strength also appeared as a result of calcination at 350° C. for 55 hours.

Conclusions

By comparing the results of Embodiments 1-7 and Comparative Examples 1-4 as shown in Table 1, the following can be concluded:

1. From the results of Embodiment 1 and Comparative Example 1, addition of 10 nm aluminum oxide as the proposed metallic oxide led to, as a result of calcination of 380° C.×55 hr, 0.038% LOI, being more desirable than 0.05% LOI presented by Comparative Example 1 where no assistant was added. Even when the time for calcination reduced to 42 hr from 55 hr, its LOI of 0.047% is still lower than 0.072% as presented by Comparative Example 1. When the time for calcination was remained at 55 hr and the temperature for calcination was lowered to 350° C. from 380° C., the resultant loss on ignition 0.049% is more preferable than 0.081% LOI of Comparative Example 1, proving that nano metallic oxide is helpful to cracking.

2. As Embodiment 1 and Comparative Example 2 both included metallic oxide, the results thereof indicate that by adding 10 nm aluminum oxide as the proposed nano metallic oxide, under three different conditions of calcination, the resultant values of loss on ignition (LOI %) were all much better than those caused by metallic oxide of a normal particle diameter.

3. From the results of Embodiment 2 and Comparative Example 1, by adding 1 gram of 10 nm aluminum oxide as the proposed metallic oxide and 3 grams of DCP as the proposed peroxide, under calcination of 380° C.×55 hr, the resultant 0.035% LOI is more desirable than 0.05% LOI presented by Comparative Example 1 where no assistant was added. Even when the time for calcination was reduced to 42 hr from 55 hr, the resultant 0.045% LOI is still lower than 0.072% as presented by Comparative Example 1. When the temperature for calcination was reduced to 350° C. from 380° C. with the time remained at 55 hr, the resultant LOI was 0.047%, better than 0.081% of Comparative Example 1. This reveals that by using DCP as the proposed peroxide together with the proposed metallic oxide, synergism can be provided.

4. Embodiment 3 containing 1 gram of 10 nm aluminum oxide as the proposed metallic oxide and 1 gram of NPG as the proposed sensitizer had, after calcination, its LOI slightly higher than that shown in Embodiment 2, but better than Comparative Example 1 where no assistant was added.

5. The slurry formula as described in Embodiment 4 is the preferred embodiment of the present invention. Under three different conditions of calcination, this slurry formula remained its LOI under 0.045%, and the fiberglass cloth presented the highest tensile strength after calcination at 350° C. for 55 hours. This reveals that by using the sensitizer together with DCP as the proposed peroxide and the metallic oxide, synergism can be provided.

6. The fiberglass cloth samples impregnated with the slurry formulas of Embodiment 1 through 7 were tested and all presented loss on ignition lower than 0.05%. As compared with those of Comparative Examples 1 through 4, this demonstrates that the desired slurry formula only needs one or more of the sensitizer and the peroxide in addition to metallic oxide to effectively achieve the objective of lowering the fiberglass fabric's loss on ignition, maintaining the fiberglass fabric's good tensile strength and enhancing the fiberglass fabric's desizing efficiency.

7. The fiberglass cloth samples impregnated with the slurry formulas of Embodiment 1 through 7 received calcination at 380° C. or 350° C. for 55 hours were tested for post-calcination tensile strength, and all the samples related to calcination at 350° C. for 55 hours presented higher tensile strength. This demonstrates that the desired slurry formula only needs one or more of the sensitizer and the peroxide in addition to metallic oxide to effectively achieve the objective of lowering the fiberglass fabric's desizing temperature and saving energy.

8. The fiberglass cloth samples impregnated with the slurry formulas of Embodiment 1 through 7 received calcination at 380° C. for 42 hours or 55 hours were tested for post-calcination tensile strength, and all the samples related to calcination at 380° C. for 42 hours presented higher tensile strength. This demonstrates that the desired slurry formula only needs one or more of the sensitizer and the peroxide in addition to metallic oxide to effectively achieve the objective of shortening the fiberglass fabric's desizing time and saving energy.

TABLE 1

Slurry Formulas and Physical Properties of Embodiments and Comparative Examples

| Slurry Composition | | | Embodiment 1 | 2 | 3 | 4 | 5 | 6 | 7 | Comparative Example 1 | 2 | 3 | 4 |
|---|---|---|---|---|---|---|---|---|---|---|---|---|---|
| Known Raw Slurry[12] | | | 100 | 100 | 100 | 100 | 100 | 100 | 100 | 100 | 100 | 100 | 100 |
| Metallic Oxide | Aluminum Oxide[1] | | 1 | 1 | 1 | 1 | — | — | 0.5 | — | — | — | — |
| | Zirconium Oxide[2] | | — | — | — | — | 1 | — | 0.5 | — | — | — | — |
| | Aluminum Oxide & Silicon Oxide[3] | | — | — | — | — | — | 1 | — | — | — | — | — |
| | Aluminum Oxide[4] | | — | — | — | — | — | — | — | — | 1 | — | — |
| Sensitizer | NPG[5] | | — | — | 1 | 1 | — | — | — | — | — | 1 | — |
| | CHEMCURE96[6] | | — | — | — | — | 1 | — | — | — | — | — | — |
| | EAB[7] | | — | — | — | — | — | 1 | 1 | — | — | — | — |
| Peroxide | TBCP[8] | | — | — | — | — | 3 | — | — | — | — | — | — |
| | DCP[9] | | — | 3 | — | 3 | — | — | — | — | — | — | 3 |
| | TBP[10] | | — | — | — | — | — | 3 | — | — | — | — | — |
| | BPO[11] | | — | — | — | — | — | — | 3 | — | — | — | — |
| Calcination Condition & Physical Property | 380° C. × 55 hr | LOI(%) | 0.038 | 0.035 | 0.038 | 0.031 | 0.033 | 0.035 | 0.034 | 0.050 | 0.052 | 0.049 | 0.049 |
| | | Tensile Strength MD kg/cm$^2$ | 21.6 | 21.8 | 21.7 | 21.9 | 21.6 | 21.7 | 21.5 | 21.6 | 21.5 | 21.3 | 21.4 |
| | | Tensile Strength CD kg/cm$^2$ | 13.6 | 13.7 | 13.6 | 13.8 | 13.4 | 13.2 | 13.6 | 13.3 | 13.0 | 13.2 | 13.3 |
| | 380° C. × 42 hr | LOI(%) | 0.047 | 0.045 | 0.047 | 0.038 | 0.045 | 0.046 | 0.043 | 0.072 | 0.078 | 0.070 | 0.061 |
| | | Tensile Strength MD kg/cm$^2$ | 22.2 | 22.3 | 22.4 | 22.5 | 22.6 | 22.4 | 22.3 | 22.1 | 21.9 | 22.0 | 22.2 |
| | | Tensile Strength CD kg/cm$^2$ | 13.8 | 13.9 | 14.2 | 13.9 | 13.8 | 13.7 | 13.9 | 13.8 | 13.7 | 13.8 | 13.9 |
| | 350° C. × 55 hr | LOI(%) | 0.049 | 0.048 | 0.049 | 0.045 | 0.047 | 0.048 | 0.046 | 0.081 | 0.085 | 0.076 | 0.072 |
| | | Tensile Strength MD kg/cm$^2$ | 28.4 | 29.3 | 28.4 | 30.8 | 29.5 | 29.3 | 28.4 | 28.4 | 28.2 | 28.6 | 28.9 |
| | | Tensile Strength CD kg/cm$^2$ | 18.4 | 18.6 | 18.7 | 19.3 | 18.2 | 18.9 | 18.3 | 18.3 | 18.1 | 18.9 | 18.7 |

Remarks:
[1]Aluminum oxide had a particle diameter of 10 nm.
[2]Zirconium oxide had a particle diameter of 10 nm.
[3]Aluminum oxide were mixed with silicon oxide, with a particle diameter of 10-20 nm.
[4]Aluminum oxide had a particle diameter of 3-5 μm.
[5]NPG was obtained from CHEMBRIDGE INTL. CORP.
[6]CHEMCURE 96 was obtained from CHEMBRIDGE INTL. CORP.
[7]EAB was obtained from HODOGAYA CHEMICAL CO.
[8]TBCP branded as Trigonox T was obtained from AKZO NOBEL CO.
[9]DCP branded as Perkadox BC-FF was obtained from AKZO NOBEL CO.
[10]TBP branded as Trigonox C was obtained from AKZO NOBEL CO.
[11]BPO branded as Perkadox L-50S was obtained from AKZO NOBEL CO.
[12]The known raw slurry contained paste, oil, a surfactant, a softening agent and water.

What is claimed is:

1. A slurry composition containing a cracking agent, having 4.0-8.0 wt % of solid in an aqueous slurry solution and comprising:
   (a) paste, taking up 10.5-4.0 wt % of the slurry solution and being one selected from or a mixture of any two or more selected from the group consisting of starch, vinyl emulsion and polycondensation emulsion;
   (b) oil, taking up 1.0-3.0 wt % of the slurry solution and being one selected from or a mixture of any two or more selected from the group consisting of hydrogenated corn oil, soybean oil, adipocere and plant oil;
   (c) a surfactant, taking up 0.2-0.5 wt % of the slurry solution and being one selected from or a mixture of the group consisting of polyethyleneglycol sorbitan and polyethylene oxide;
   (d) a softening agent, taking up 0.1-0.5 wt % of the slurry solution and being one selected from or a mixture of any two or more selected from the group consisting of amine, vinylamine oxide, quaternary ammonium salts and cation derivative; and
   (e) a cracking agent, taking up 0.005-5.0 wt % of the slurry solution, wherein the cracking agent contains 0.005-5 wt % of a metallic oxide, 0-5 wt % of a peroxide and 0-5 wt % of a sensitizer, and wherein the metallic oxide is a sinter formed by firing or co-firing, under a high temperature, any one or more selected from the group consisting of aluminum oxide, silicon dioxide, germanium oxide, nickel oxide, zinc oxide, copper oxide, cobalt oxide, iron oxide, manganese oxide, chromium oxide, titanium oxide, magnesium oxide, calcium oxide, tungsten oxide, zirconium oxide, tin oxide and gallium oxide.

2. The slurry composition of claim 1, wherein the metallic oxide has a particle diameter of 3-200 nm.

3. The slurry composition of claim 1, wherein the peroxide is one selected from or a mixture of any two or more selected from the group consisting of 2,5-dimethyl-2,5-bis(tert-butylperoxy)hexane, di-tert-butyl peroxide, dicumyl peroxide, benzoyl peroxide, t-butylcumyl peroxide and tart-butyl peroxybenzoate.

4. The slurry composition of claim 1, wherein the sensitizer is one selected from or a mixture of any two or more selected from the group consisting of 4,4'-Azobis(4-cyanopentanoic Acid), 2,2-Azobis(2,4,4-trimethylpentane), N-phenyl glycine, tetraethyl Michler's ketone and 1,7-bis(9-acridinyl) heptane.

* * * * *